United States Patent
Nielsen

(10) Patent No.: US 12,331,494 B2
(45) Date of Patent: Jun. 17, 2025

(54) SYSTEM FOR REGULATING A TEMPERATURE OF A THERMAL ENERGY CARRYING FLUID IN A SECTOR OF A FLUID DISTRIBUTION NETWORK

(71) Applicant: GRUNDFOS HOLDING A/S, Bjerringbro (DK)

(72) Inventor: Brian Kongsgaard Nielsen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 332 days.

(21) Appl. No.: 17/859,127

(22) Filed: Jul. 7, 2022

(65) Prior Publication Data

US 2023/0018443 A1 Jan. 19, 2023

(30) Foreign Application Priority Data

Jul. 9, 2021 (EP) .................................... 21184830

(51) Int. Cl.
*E03B 7/02* (2006.01)
*E03B 7/07* (2006.01)

(52) U.S. Cl.
CPC ............... *E03B 7/075* (2013.01); *E03B 7/02* (2013.01); *E03B 7/077* (2013.01)

(58) Field of Classification Search
CPC . E03B 7/075; E03B 7/02; E03B 7/077; E03B 11/00; E03B 7/045; E03B 7/00; E03B 11/10; E03B 7/074; F28F 27/02; F28F 27/006; F28F 27/003
See application file for complete search history.

(56) References Cited

U.S. PATENT DOCUMENTS

| | | | |
|---|---|---|---|
| 6,536,464 B1 * | 3/2003 | Lum ...................... | E03B 7/09 122/13.3 |
| 2005/0183773 A1 * | 8/2005 | Sinclaire ............... | E03B 7/04 137/357 |
| 2011/0186012 A1 * | 8/2011 | Wong ................... | F02D 19/022 123/445 |

(Continued)

FOREIGN PATENT DOCUMENTS

| EP | 2874039 B1 | | 3/2017 |
|---|---|---|---|
| EP | 3809051 A1 | * | 4/2021 |
| KR | 10-1047423 B1 | | 7/2011 |

*Primary Examiner* — Catherine T. Rastovski
*Assistant Examiner* — Sharad Timilsina
(74) *Attorney, Agent, or Firm* — McGlew and Tuttle, P.C.

(57) ABSTRACT

A system (15) regulates a temperature of fluid in a sector of a fluid distribution network, including a feed line (11) transporting fluid from a thermal energy source (3) to a thermal energy consumer (7) within the sector and a return line (13) transporting fluid back. A bypass line (17) connects the return line to the feed line, mixing fluid from the return line into the feed line. A pump is at the bypass line. A temperature sensor determines a temperature of fluid in the feed line downstream of the bypass line. A pressure sensor determines an uncontrolled pressure difference between the feed line and the return line, or an uncontrolled pressure difference correlated therewith. A control unit controls the speed of the pump with a closed-loop control for achieving a target feed line temperature based on the determined temperature, and a feed-forward control compensating fluctuations of the pressure difference.

19 Claims, 8 Drawing Sheets

(56) References Cited

U.S. PATENT DOCUMENTS

| | | | |
|---|---|---|---|
| 2015/0136377 A1* | 5/2015 | Kallesoe | F24D 5/04 236/13 |
| 2016/0195092 A1* | 7/2016 | Springer | F04D 15/0027 415/49 |
| 2020/0332738 A1* | 10/2020 | Kusunoki | F02D 41/0077 |

* cited by examiner

SYSTEM FOR REGULATING A TEMPERATURE OF A THERMAL ENERGY CARRYING FLUID IN A SECTOR OF A FLUID DISTRIBUTION NETWORK

CROSS REFERENCE TO RELATED APPLICATIONS

This application claims the benefit of priority under 35 U.S.C. § 119 of European Application 21184830.4, filed Jul. 9, 2021, the entire contents of which are incorporated herein by reference.

TECHNICAL FIELD

The present disclosure relates to a system for regulating a temperature of a thermal energy carrying fluid in a sector of a fluid distribution network, in particular of a district heating network.

BACKGROUND

Typically, a fluid distribution network distributes thermal power in form of hot or cold fluid to a plurality of thermal energy consumers connected to a fluid distribution network. The fluid distribution network usually comprises a plurality of sectors, wherein each sector comprises a plurality of thermal energy consumers. In case of a heating distribution network, a sector of a heating distribution network may, for instance, be a neighborhood, a street or another kind of agglomeration of thermal energy consumers, i.e. households, commercial consumers and/or industrial consumers. A utility provider operating a heating distribution network has an interest in operating the heating distribution network as efficiently as possible. This means that a utility provider would like to regulate the temperature of the thermal energy carrying fluid in a sector of a fluid distribution network to a desired target temperature. If the temperature in a sector of a heating distribution network is too low, the thermal energy consumers are not sufficiently supplied with thermal energy and may complain. If, however, the temperature is too high, the energy loss in the heating distribution network is high.

An idea to regulate the temperature in a sector of the heating distribution network is to mix a part of the colder fluid in a return line through a bypass line or shunt line back into a feed line supplying the sector with thermal energy carrying fluid. A pump is needed in the bypass line or shunt line, because the pressure in the feed line is higher than in the return line. EP 2 874 039 B1 describes in general a principal of mixing return line fluid back into a feed line by means of a bypass line.

The heat transfer system described in EP 2 874 039 B1 comprises pumps and/or valves in the feed line or return line in order to control the pressure and/or flow in the feed line and the return line. In some fluid distributions systems, it is not desirable to use valves in the feed or return lines of the heat transfer system due to hydraulic pressure loss. In these cases, a pump is then used in the by-pass line instead. In that case, a problem arises, however, when the pressure or flow in the feed line and the return line is subject to disturbances or fluctuations that cannot be controlled. For example, the disturbances or fluctuations of the pressure differential between the feed line and the return line may originate from unpredictably changing consumption of thermal power at the consumer side. Thus, the pressure difference between the feed line and the return line in a sector of a heating distribution network may be in principle uncontrolled or uncontrollable. That creates, however, a problem for the temperature control, because a small change in the pressure difference between the feed line and the return line may lead to a large change in flow through the pump in the bypass line. Large changes of flow in the bypass line have a large and delayed effect on the feed line temperature to be controlled.

SUMMARY

A solution to reduce the disturbances or fluctuations of the feed line temperature due to fluctuations of the uncontrolled pressure difference between the feed line and the return line could be to install a pressure reducing valve in the feed line and/or the return line of the heating distribution network. That, however, would alter the pressure balance and add hydraulic loss, and thus would reduce the efficiency of the thermal power transfer. That may not be an acceptable solution for a utility provider of a heating distribution network.

The problem of the present disclosure is thus to control the flow in a bypass line for mixing return fluid into the feed line, despite of uncontrolled disturbances or fluctuations of the pressure difference between the feed line and the return line, in such a way that the temperature in a sector of the fluid distribution network is efficiently regulated to a stable desired target temperature.

A solution to this problem is given by the subject matter of the independent claims. Preferred embodiments of the present disclosure are subject of the dependent subclaims, the description and the figures.

According to a first aspect of the present disclosure, a system is provided for regulating a temperature of a thermal energy carrying fluid in a sector of a fluid distribution network, the fluid distribution network comprising a feed line for transporting the fluid from a thermal energy source to at least one thermal energy consumer located within the sector and a return line for transporting the fluid back from the at least one thermal energy consumer to the thermal energy source. The system comprises:
- a bypass line connecting the return line to the feed line for mixing fluid from the return line into the feed line,
- at least one bypass pump being arranged at the bypass line for pumping fluid from the return line to the feed line,
- a control unit being configured to directly or indirectly control a speed of the at least one bypass pump,
- at least one temperature sensor being arranged and configured to determine a temperature of the fluid in the feed line downstream of the bypass line, and
- at least one pressure sensor being arranged and configured to determine an uncontrolled pressure difference between the feed line and the return line, or a pressure difference correlating therewith.

The control unit is configured to control the speed of the at least one bypass pump based on a combination of:
- a closed-loop control to provide a fluid flow in a bypass line for archiving a target feed line temperature based on the determined feed line temperature, and
- a feed-forward control to compensate fluctuations of the pressure difference between the feed line and the return line based on the determined pressure difference.

The system is in particular suitable for regulating a temperature of a heat carrying fluid in a sector of a heating distribution network. However, the system is also applicable for other kinds of fluid distribution networks for transporting thermal energy to consumers, wherein the pressure difference between the feed line and the return line is uncontrolled or uncontrollable. The control unit may directly control the speed of the at least one bypass pump by setting a target speed or indirectly by setting a power, motor current or other operating parameter of the bypass pump that correlates with the speed. For example, the control unit may set the at least one bypass pump to run at a target percentage of the maximum speed.

Optionally, the control unit may be configured to combine the closed-loop control and the feed-forward control by determining a target speed as a parameterized pump model-based function $\omega = f^{-1}(q^*(T_1), p)$, wherein the pump model-based function $\omega = f^{-1}(q^*(T_1), p)$ is parameterized by at least two predetermined parameters $a_{h1}$, $a_{h3}$. Preferably, the control unit sets a target bypass fluid flow $q^*(T_1)$ to minimize a deviation $e_T$ between the determined feed line temperature $T_1$ and a target feed line temperature $T^*_1$. More preferably, the control unit sets a pump differential pressure p to compensate for the determined pressure difference $\Delta p$. For example, the control unit may use a model of the pump, wherein the pump describes the pump head h as a function of the flow q through the pump and the speed $\omega$ of the pump. For example, such a model may be given by $$h = a_{h3} q^2 + a_{h1} \omega^2.$$

It could also be a higher order model, such as $$h = a_{h3} q^2 + a_{h2} q \omega + a_{h1} \omega^2$$

Or even a higher order such as $$h = a_{h7} \frac{q^6}{\omega^4} + a_{h6} \frac{q^5}{\omega^3} + a_{h5} \frac{q^4}{\omega^2} + a_{h4} \frac{q^3}{\omega} + a_{h3} q^2 + a_{h2} q \omega + a_{h1} \omega^2 + a_{h0}.$$

These models may be described as a function mapping the pump flow q and the pump speed $\omega$ to the pump head h, i.e. $h = f(q, \omega)$.

The conversion between the pump head and the pump differential pressure may be given by $$h = \frac{p}{\rho g}$$

wherein $\rho$ is the mass density of the thermal energy carrying fluid, g is the gravitational acceleration and p is the pump differential pressure. As the mass density $\rho$ and the gravitational acceleration g may be considered constant with good approximation, the pump model may also be expressed in terms of the pump differential pressure $p = f(q, \omega)$.

The inverse of the function $f$ may then be used to determine a target speed $\omega$ by $\omega = f^{-1}(q^*(T_1), p)$, wherein the pump differential pressure p is set to compensate the differential pressure $\Delta p$ measured by the pressure sensor, i.e. $p = \Delta p$.

If a simple quadratic pump model is used as shown above, the target speed $\omega$ may be parameterized by two parameters $a_{h1}$ and $a_{h3}$ given in the formula as follows:

$$w = \sqrt{\frac{p - a_{h3} q^*(T_1) \cdot |q^*(T_1)|}{a_{h1}}}.$$

The formula calculates the pump speed as a function of the set pump differential pressure and the target flow. It is advantageous as shown in the formula, to replace the squared flow by its signed counter part $q^*(T_1) \cdot |q^*(T_1)|$. This has the advantage that, depending on the target flow $q^*(T_1)$, set by the closed-loop control to provide a fluid flow in the bypass line, the pump may be set at a higher or a lower speed of than the speed indirectly provided by the set pump differential pressure.

The target bypass fluid flow $q^*(T_1)$ may be set to minimize a deviation $e_T = T^*_1 - T_1$ between the determined feed line temperature $T_1$ and the target feed line temperature $T^*_1$. This is just an example and any kind of closed-loop control may be used to determine the target bypass fluid flow $q^*(T_1)$ based on the feed line temperature $T_1$, e.g. fully or partly as a closed-loop control feedback value $q^*_{feedback}$ as follows:

$$q^*_{feedback} = K_p e_T = K_i \int e_T dt,$$

wherein $K_p$ and $K_i$ are gain factors.

Optionally, one of the at least two predetermined parameters $a_{h1}$, $a_{h3}$ is a no-flow parameter, e.g. $a_{h1}$, indicative of the pressure provided by the at least one bypass pump at a certain speed $\omega$ and no bypass flow, i.e. $q = 0$.

Optionally, the system may further comprise a non-return valve at the bypass line downstream of the at least one bypass pump, wherein the non-return valve is configured to prevent a fluid flow through the bypass line from the feed line to the return line. This is beneficial to prevent any backward flow which would be very inefficient in terms of energy consumption.

Optionally, the at least one pressure sensor may be arranged and configured to determine the pressure difference $\Delta p$ by measuring a difference between a pressure in the bypass line upstream of the at least one bypass pump or in the return line, and a pressure downstream of the non-return valve or upstream of the non-return valve, or a pressure in the feed line upstream of the at least one bypass line.

Optionally, the system may further comprise at least one temperature sensor being arranged and configured to determine a temperature $T_2$ of the fluid in the return line. The system may further comprise at least one temperature sensor being arranged and configured to determine a temperature $T_3$ of the fluid in the feed line upstream of the bypass line. The control unit may be configured to set a target speed further based on a feed-forward control to compensate uncontrollable fluctuations of a temperature difference $T_3 - T_2$ between the temperature $T_3$ of the fluid in the feed line upstream of the bypass line and the temperature $T_2$ of the fluid in the return line. This is particularly advantages in case of uncontrollable fluctuations of a temperature difference $T_3 - T_2$ in addition to the uncontrolled fluctuations of the pressure difference between the feed line and the return line. So, this is an additional feed-forward control if two more temperature sensors are available to determine the temperature $T_3$ of the fluid in the feed line upstream of the bypass line and the temperature $T_2$ of the fluid in the return line. Flow balance and energy conservation demands that: $q_1(T_1 - T_2) = q_3(T_3 - T_2)$ and $q_2(T_1 - T_2) = q_3(T_3 - T_1)$, wherein $q_1$ is the flow in the feed line downstream of the bypass line, $q_2$ is the flow through the bypass pump, and $q_3$ is the flow in the feed line upstream of the bypass line. This means that a flow differential $dq_2$ through the pump is needed to compensate for a change $dT_2$ of the return temperature according to the following formula:

$$dq_2 = \frac{q_2}{T_3 - T_2} dT_2.$$

The pump flow $q_2$ may be estimated based on a pump model, e.g. based on pump-related variables such as speed and/or power and/or pump head. The following formula applies to the time derivatives $$\frac{dq_2}{dt} = \frac{q_2}{T_3 - T_2} \frac{dT_2}{dt}.$$

It is now possible to add a feed-forward controlled flow part $q^*_{feedforward}$ to the closed-loop controlled target bypass flow $q^*(T_1)$ as follows:

$$q^* = q^*_{feedback} + q^*_{feedforward} = q^*_{feedback} + \int \frac{q_2}{T_3 - T_2} \frac{dT_2}{dt} dt.$$

A problem of the integral term in the above equation is that the feed-forward part $q^*_{feedforward}$ may drift over time and a windup of the feed-forward control should be prevented. As a solution to this, the control unit may be optionally configured to apply, before setting the target speed based on the feed-forward control, a lowpass filter to a sum of differential flow compensation values $$\frac{dq_2}{dt}$$

for compensating the uncontrolled fluctuations of the temperature $T_3$ of the fluid in the feed line upstream of the bypass line and of the temperature $T_2$ of the fluid in the return line. Such a lowpass filter behaves like an integration for high frequencies and outputs the feed-forward flow part $q^*_{feedforward}$ as output of the filter.

The lowpass filter may be described as a transfer function $H(s)$ in the Laplace domain by $Y(s)=H(s)X(s)$, where $Y(s)$ is the output of the filter and $X(s)$ is the input of the filter. s is the Laplace variable. The complex transfer function describing the lowpass filter as a first order delay element, e.g. a $pt_1$-element, may be chosen to be $$G(s) = \frac{K}{1 + \tau s}.$$

K may be denoted as the filter gain or transfer constant and $\tau$ is the time constant. For the filter to behave asymptoticly in the same way as an integrator for higher frequencies, K may be depended on $\tau$. For example, the filter may have the same gain as an integrator at a frequency which is $$\frac{10}{\tau}$$

and the filter gain may be selected to be $$K = \sqrt{\frac{101}{10}} \tau \approx 10\tau.$$

In order to compensate any fluctuations of the temperature $T_3$ in the feed line upstream of the bypass line, the following differential aquation may be used:

$$\frac{dq_2}{dt} = \frac{q_3}{T_3 - T_2} \frac{dT_3}{dt} = \frac{q_2(T_1 - T_2)}{(T_3 - T_1)(T_3 - T_2)} \frac{dT_3}{dt}$$

The two differential flow compensation values $$\frac{dq_2}{dt}$$

for compensation the uncontrolled fluctuations of $T_2$ as well as $T_3$ may be summed up and fed into the low pass filter described above to get the feed-forward controlled flow part $q^*_{feedforward}$.

Optionally, the control unit may be configured to stop the at least one bypass pump if the pump speed is below a predetermined stop speed threshold $\omega_{stop}$. For example, $\omega_{stop}$ may be defined to be 10% or 15% of the maximum pump speed.

Optionally, the control unit may be configured to start the at least one bypass pump if the pump speed is at or above a pre-determined start speed threshold $\omega_{start}$. $\omega_{start}$ may be the same value as $\omega_{stop}$ or a different value. For example, $\omega_{start}$ may be higher than $\omega_{stop}$, e.g. 20% of the maximum pump speed.

Optionally, the control unit may be configured, upon start-up of the at least one bypass pump, to ramp up the feed forward control to compensate uncontrolled fluctuations of the pressure difference $\Delta p$ based on a ramp up value multiplied with the determined pressure difference $\Delta p$. In other words, a ramp up function is applied that slowly ramps up the differential pressure signal before it is fed into the pump model. The ramp up function may be given by $\int_{t_0}^{t_1} C\, dt$, wherein C is a constant selected such that the output of the integral is 0 at time $t_0$ when the pump starts and 1 at time $t_1$, when the time $t_1-t_0$ has elapsed. The output of the integral is multiplied with the differential pressure signal, whereby it is slowly ramped up during the time $t_1-t_0$. This has the advantaged that the set point overshoot or undershoot of the target temperature $T_1$ is kept low if the pump model function is not accurate.

According to a second aspect of the present disclosure, a method is provided for regulating a temperature of a thermal energy carrying fluid in a sector of a fluid distribution network, the fluid distribution network comprising a feed line for transporting the fluid from a thermal energy source to at least one thermal energy consumer located within the sector, a return line for transporting the fluid back from the at least one thermal energy consumer to the thermal energy source, and a bypass line connecting the return line to the feed line for mixing fluid from the return line into the feed line. The method comprises the following steps:

Determining a temperature $T_1$ of the fluid in the feed line downstream of the bypass line by at least one temperature sensor, Determining a pressure difference $\Delta p$ between the feed line and the return by at least one pressure sensor, or a pressure difference correlating therewith, Directly or indirectly controlling a speed $\omega$ of at least one bypass pump being arranged at a bypass line connecting the return line to the feed line for mixing fluid from the return line into the feed line.

Said directly or indirectly controlling of the speed of the at least one bypass pump is based on a combination of:

a closed-loop control to provide a fluid flow in a bypass for achieving a target feed line temperature $T^*_1$ based on the determined feed line temperature $T_1$, and a feed-forward control to compensate uncontrolled fluctuations of the pressure difference $\Delta p$ between the feed line and the return line based on the determined pressure difference $\Delta p$.

Optionally, the combination of the closed-loop control and the feed forward control comprises determining a target speed $\omega$ as a parametrized pump model-based function $\omega = f^{-1}(q^*(T_1), p)$, wherein a target bypass fluid flow $q^*(T_1)$ is set to minimize a deviation $e_T$ between the determined feed line temperature $T_1$ and the target feed line temperature $T^*_1$, and wherein a pump differential pressure p is set to compensate for the determined pressure distance $\Delta p$, wherein the pump model-based function $\omega = f^{-1}(q^*(T_1), p)$ is parametrized by at least two predetermined parameters $a_{h1}$, $a_{h3}$.

Optionally, one of the at least two predetermined parameters $a_{h1}$, $a_{h3}$, e.g. $a_{h1}$, is a no-flow parameter $a_{h1}$ indicative of the pressure provided by the at least one bypass pump at a certain speed $\omega$ and no bypass flow, i.e. q=0.

Optionally, the method may further comprise preventing a fluid flow through the bypass line from the feed line to the return line by a non-return valve arranged at a bypass line downstream of the at least one bypass pump.

Optionally, determining the pressure difference may comprise measuring a difference between a pressure in the bypass line upstream of the at least one bypass pump or in the return line, and a pressure-downstream of the non-return valve or upstream of the non-return valve, or a pressure in the feed line upstream of the at least one bypass line.

Thus, there are at least six options for determining the pressure difference $\Delta p$, i.e. by a difference 1. between a pressure in the bypass line upstream of the at least one bypass pump and a pressure-downstream of the non-return valve;
2. between a pressure in the bypass line upstream of the at least one bypass pump and a pressure in the bypass line upstream of the non-return valve;
3. between a pressure in the bypass line upstream of the at least one bypass pump and a pressure in the feed line upstream of the at least one bypass line;
4. between a pressure in the return line and a pressure-downstream of the non-return valve;
5. between a pressure in the return line and a pressure in the bypass line upstream of the non-return valve; and
6. between a pressure in the return line and a pressure in the feed line upstream of the at least one bypass line.

Optionally, the method may further comprise determining a temperature $T_2$ of the fluid in the return line by at least one temperature sensor, and may further comprise determining a temperature $T_3$ of the fluid in the feed line upstream of the bypass line by at least one temperature sensor, wherein directly or indirectly controlling of the speed $\omega$ of the at least one bypass pump may comprise setting a target speed $\omega$ based on a feed-forward control to compensate uncontrolled fluctuations of a temperature difference $T_3 - T_2$ between the temperature $T_3$ of the fluid in the feed line upstream of the bypass line and the temperature $T_2$ of the fluid in the return line.

Optionally, the method may further comprise applying, before setting the target speed $\omega$ based on the feed-forward control, a low pass filter to a sum of differential flow compensation values $$\frac{dq_2}{dt}$$

for compensating the uncontrolled fluctuations of the temperature $T_3$ of the fluid in the feed line upstream of the bypass line and of the temperature $T_2$ of the fluid in the return line.

Optionally, the method may further comprise stopping the at least one bypass pump if the speed $\omega$ is below a predetermined stop speed threshold $\omega_{stop}$.

Optionally, the method may further comprise starting the at least one bypass pump if the pump speed $\omega$ is at or above a predetermining start speed threshold $\omega_{start}$.

Optionally, the method may further comprise ramping up, upon start-up of the at least one bypass pump, the feed forward control to compensate uncontrolled fluctuations of the pressure difference $\Delta p$ based on a ramp-up value multiplied with the determined pressure difference $\Delta p$.

Embodiments of the present disclosure will be described by way of example with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
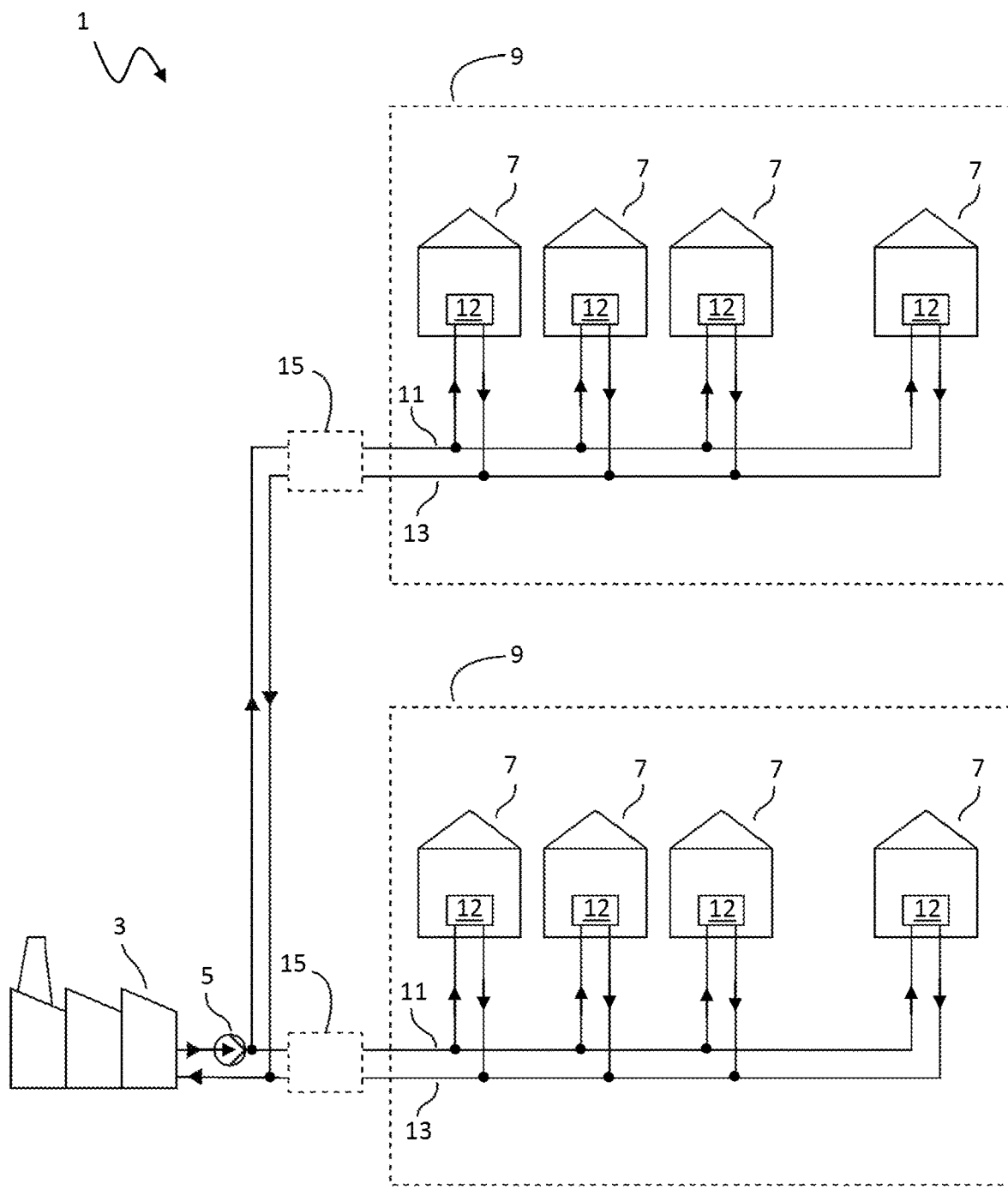
FIG. 1 is a schematic view showing an example of a heating distribution network comprising a system according to the present disclosure.

FIG. 1 shows a fluid distribution network 1 in form of a heating distribution network. The fluid distribution network 1 comprises a thermal energy source 3 in form of a heat generating plant. The thermal energy source fluid that is pumped by a feeder pump 5 through a feed line carries thermal energy for transporting said thermal energy through the feed line from the thermal energy source 3 to a plurality of thermal energy consumers 7 in form of households. The thermal energy consumers 7 are located within a sector 9 of the fluid distribution network 1. The fluid distribution network 1 may comprise a single sector 9, or a plurality of sectors 9 as shown in FIG. 1. A sector 9 of the fluid distribution network 1 may be defined by being supplied with fluid by a common feed line 11 that transports the thermal energy carrying fluid to the thermal energy consumers 7 located in the sector 9 of the fluid distribution network 1. The thermal energy carrying fluid delivers the thermal energy to the thermal energy consumers 7 by means of a heat exchanger 12 at each thermal energy consumer 7. The fluid is then returned back from the thermal energy consumers 7 to the thermal energy source 3 via a return line 13. The fluid distribution network 1 further comprises a system 15 for regulating the temperature of the thermal energy carrying a fluid in the sector 9.

Figure 2:
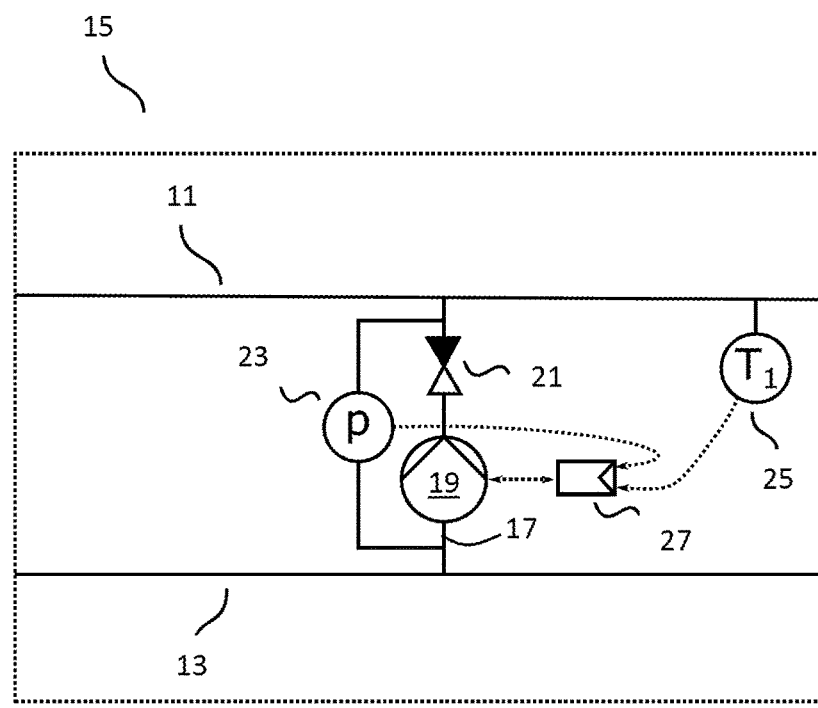
FIG. 2 is a schematic view showing a first embodiment of a system according to the present disclosure.

FIG. 2 shows an embodiment of the system 15 in more detail. The idea is to regulate the temperature of the fluid in the sector 9 by mixing fluid from the return line 13 to the feed line 11 via a bypass line 17. As the pressure in the feed line 11 exceeds a pressure in the return line 13, a bypass pump 19 is installed in the bypass line 17 in order to overcome a pressure difference Δp between the feed line 11 and the return line 13. In order to prevent any backflow through the bypass line 17 from the feed line 11 to the return line 13, a non-return valve 21 is installed in the bypass line downstream of the bypass pump 19. This means that the bypass pump 19 must also provide sufficient pressure for opening the non-return valve in the direction towards the feed line 11. A differential pressure sensor 23 is installed to determine a pressure difference Δp between a pressure in the bypass line 17 upstream of the bypass pump 19 and a pressure in the bypass line 17 downstream of the non-return valve 21. A first temperature sensor 25 is installed in the feed line 11 downstream of the bypass line 17 in order to determine a temperature $T_1$ in the feed line 11 downstream of the bypass line 17. The measurement of the first temperature sensor 25 is communicated to a control unit 27 that is configured to control directly or indirectly the speed ω of the bypass pump 19.

One could think that it is now sufficient to simply control the speed ω of the bypass pump 19 in a closed-loop manner based on the temperature $T_1$ measured by the first temperature sensor 25 as a feedback value. It has shown, however, that this does not work very well, because the temperature $T_1$ may be difficult to stabilize and may fluctuate too much as can be seen in the upper plot of FIG. 9a. The reason for this is that the first temperature sensor 25 is placed at a certain distance to the bypass line 17 downstream at the feed line 11 in order to measure the fluid temperature where it is sufficiently mixed downstream of the bypass line 17. Consequently, there is a relatively large time delay between a change of the speed ω of the bypass pump 19 and the result showing in a change of the temperature $T_1$ at the first temperature sensor 25. In addition, the pressure difference Δp between the feed line 11 and the return line 13 is outside of the control of the system 15, i.e. the pressure difference Δp is subject to uncontrolled or uncontrollable disturbances or fluctuations. Such disturbances or fluctuations of the pressure difference Δp may originate from varying consumption behaviour at the thermal energy consumers 7 and/or varying circumstances at the heat generating plant. Any fluctuation of the pressure difference Δp between the feed line 11 and the return line 13, however, strongly affects the effect of the bypass pump 19. Therefore, the measurement of the pressure difference Δp by the differential pressure sensor 23 is also communicated to the control unit 27 in order to perform a feed-forward control to compensate for the fluctuations of the pressure difference Δp. The inventive idea is now to control the speed of the bypass pump 19 by means of the control unit 27 based on a combination of a closed-loop control based on the determined first feed line temperature $T_1$ and a feed-forward control to compensate fluctuations of the pressure difference Δp between the feed line 11 and the return line 13 based on the pressure difference Δp determined by the differential pressure sensor 23. For example, the control unit 27 may be configured to set a target speed $$\omega = \sqrt{\frac{p - a_{hs}q^*|q^*|}{a_{h1}}},$$

which is a parametrization based on a pump model. $q^*$ is the target bypass fluid flow to be provided by the bypass pump 19 and p is the pump differential pressure to compensate for the determined pressure difference Δp. $a_{h1}$ and $a_{h3}$ are model parameters describing pump characteristics. The model parameters $a_{h1}$ and $a_{h3}$ may be predetermined pump-specific parameters provided by the manufacturer of the bypass pump 19. For example, one of the parameters $a_{h1}$ and $a_{h3}$ is a now-flow parameter indicative of the pressure provide by the bypass pump 19 at a certain speed ω and no bypass flow, i.e. q=0. The target bypass fluid flow $q^*(T_1)$ is set in a closed-loop manner to minimize a deviation $e_T=T^*_1-T_1$ between the determined feed line temperature $T_1$ and a desired target feed line temperate $T^*_1$. The result of this combination of a closed-loop control based on a temperature feedback value and a feed-forward control based on a pressure differential value is shown in FIG. 9b, which shows a very stable feed line temperature $T_1$ over the time of the day despite uncontrolled fluctuations of the pressure difference Δp between the feed line 11 and the return line 13.

Figure 3:
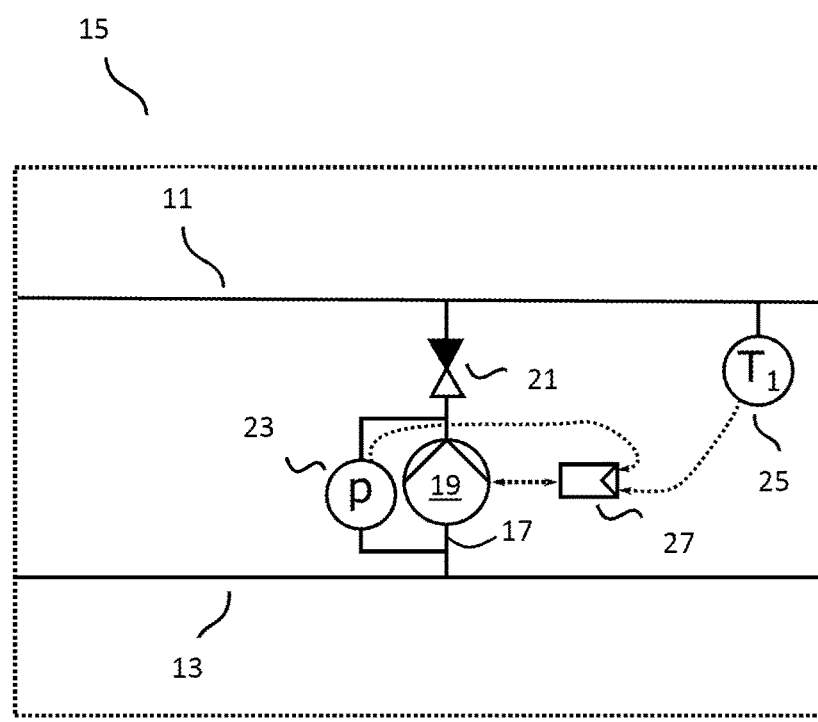
FIG. 3 is a schematic view showing another embodiment of a system according to the present disclosure.

FIG. 3 shows another embodiment of the system 15. The embodiment of FIG. 3 differs from the embodiment shown in FIG. 2 by what the differential pressure sensor 23 measures. In FIG. 3, the differential pressure sensor 23 measures a difference between a pressure at the outlet of the bypass pump, i.e. upstream of the non-return valve 21, and a pressure at an inlet of the bypass pump 19. This has the advantage that the pressure sensor 23 may be pre-installed at and/or integrated into the bypass pump 19. This embodiment, however, is less advantageous in terms of controlling, because the non-return valve 19 may have under certain circumstances difficulties to settle quickly into the correct opening degree. Fluctuations of the opening degree of the non-return valve 19, however, may cause undesired disturbances of the differential pressure measurement. This means that the compensating pump pressure differential p should be ramped-up more slowly at start-up of the bypass pump to avoid large overshooting or undershooting in the closed-loop control based on the feed line temperature $T_1$.

Figure 4:
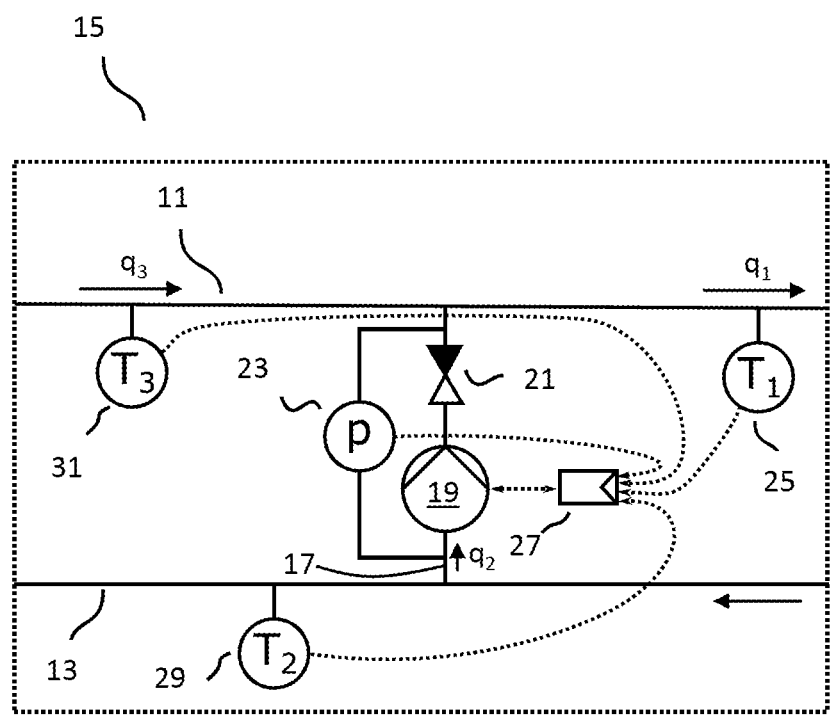
FIG. 4 is a schematic view showing a further embodiment of a system according to the present disclosure.

FIG. 4 shows another embodiment of the system 15. Compared to the embodiment shown in FIG. 2, the embodiment shown in FIG. 4 comprises two more temperature sensors, wherein a second temperature sensor 29 is installed at the return line 13 in order to determine a second temperature $T_2$. In FIG. 4, the second temperature sensor 29 is located at the return line 13 downstream of the bypass line 17. Alternatively, the second temperature sensor 29 could be located at the return line 13 upstream of the bypass line or anywhere at the bypass line 17. A third temperature sensor 31 is located at the feed line 11 upstream of the bypass line 17 in order to determine a third temperature $T_3$. With these additional temperature measurements $T_2$ and $T_3$, the system 15 is able to compensate not only for uncontrolled fluctuations of the pressure difference between the feed line 11 and the return line 13, but also for uncontrolled fluctuations of the feed line temperature $T_3$ and/or the return line temperature $T_2$. In particular, the return line temperature $T_2$ may be dependent on the thermal energy consumption at the thermal energy consumers 7. Energy conservation and flow balance demands that the following equations apply: $q_1(T_1-T_2)=q_3(T_3-T_2)$ and $q_2(T_1-T_2)=q_3(T_3-T_1)$, wherein $q_1$ is the feed line flow downstream of the bypass line 17 at the first temperature sensor 25, $q_2$ is the bypass flow through the bypass pump 19, and $q_3$ is the feed line flow upstream of the bypass line 17 at the third temperature sensor 31. In order to compensate a fluctuation $dT_2$ of the return line temperature $T_2$, the bypass flow $q_2$ must be changed by $dq_2$ as follows:

$$dq_2 = \frac{q_2}{T_3 - T_2} dT_2.$$

Over time, an uncontrolled fluctuation of the return line temperature $T_2$ could be compensated by a feed-forward controlled flow part $q^*_{feedforward}$ by integrating over time the according time derivatives $$\frac{dq_2}{dt} = \frac{q_2}{T_3 - T_2} \frac{dT_2}{dt}.$$

An integration over time may have a disadvantage that the feed forward flow part $q^*_{feedforward}$ may drift over time, and control unit 27 may face a wind-up issue.

Figure 5:
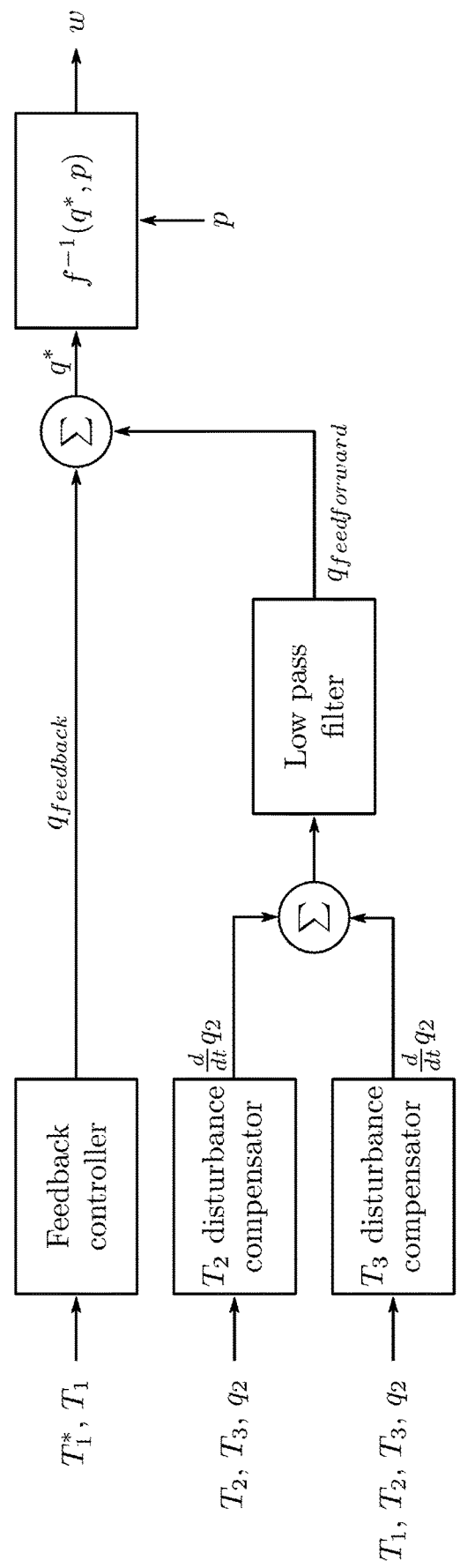
FIG. 5 is a schematic view showing an embodiment of the control method according to the present disclosure.

A solution to this problem is shown in FIG. 5, which shows an embodiment of the control method described herein. A target feed line temperature $T^*_1$ and the feed line temperature $T_1$ measured by the first temperature sensor 25 is fed into a feedback controller for a closed-loop controlled flow part $q^*_{feedback}$. The return line temperature $T_2$ and the feed line temperature $T_3$ upstream of the bypass line and the bypass fluid flow $q_2$ is fed into a $T_2$ disturbance compensator that outputs a time derivative of the bypass flow $q_2$, i.e.

$$\frac{dq_2}{dT}.$$

Analogously, the feed line temperature $T_1$ downstream of the bypass line, the return line temperature $T_2$, the feed line temperature $T_3$ upstream of the bypass line and the bypass fluid flow $q_2$ are fed into a $T_3$ disturbance compensator that outputs a time derivative of the bypass flow $q_2$, i.e.

$$\frac{dq_2}{dT},$$

using the formula $$\frac{dq_2}{dt} = \frac{q_2(T_1 - T_2)}{(T_3 - T_1)(T_3 - T_2)} \frac{dT_3}{dt}.$$

These time derivatives $$\frac{dq_2}{dt}$$

are summed-up and fed into a low pass filter that behaves for high frequencies like an integration and outputs a feed-forward controlled flow part $q^*_{feedforward}$ that is added to the closed-loop controlled flow part $q^*_{feedback}$. The sum $q^*$ is then used as a target bypass flow into an inverse pump-model function $f^{-1}(q^*,p)$, wherein p is the pump pressure differential for compensating the determined pressure difference $\Delta p$ measured by the differential pressure sensor 23, and outputs a target speed $\omega$ of the bypass pump 19.

Figure 6:
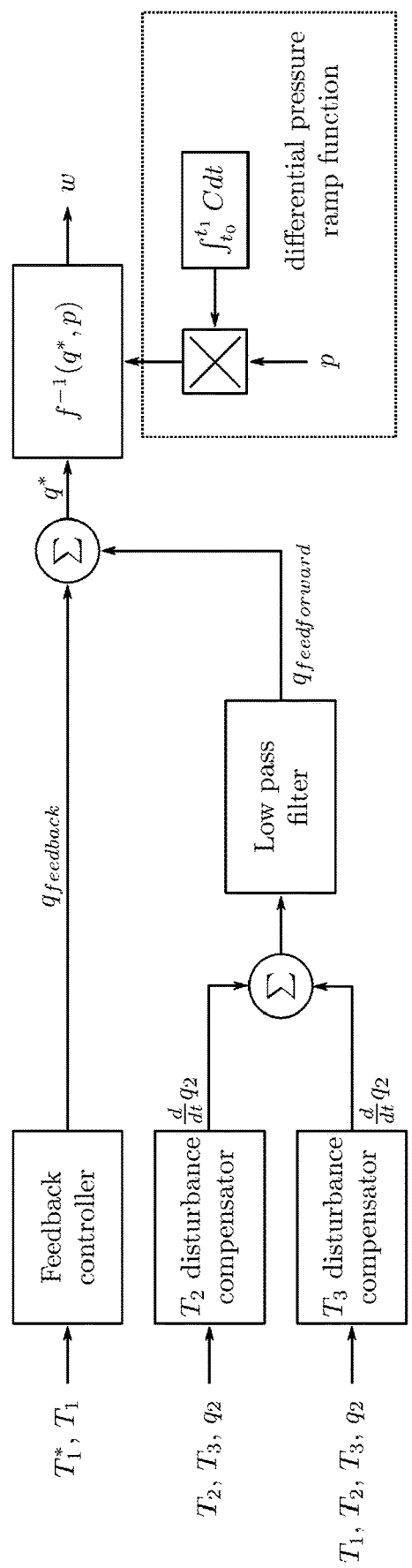
FIG. 6 is a schematic view showing a further embodiment of a control method according to the present disclosure.

FIG. 6 shows an embodiment of the control method as shown in FIG. 5 with the difference that the pump differential pressure p is not directly fed into the inverse pump-model function at start-up of the bypass pump 19, but slowly ramped-up. This is particularly advantageous for a system according to the embodiment shown in FIG. 3, wherein a differential pressure sensor 23 integrated into the bypass pump 19 is used for the feed-forward control. A differential pressure ramp-up function in form of $\int_{t_0}^{t_1} C\, dt$ is multiplied with the pump differential pressure p in order to achieve a slow ramp-up. The constant C is chosen such that the differential pressure ramp-up function is 0 at $t_0$ and 1 at $t_1$ when the time $t_1-t_2$ has elapsed.

Figure 7:
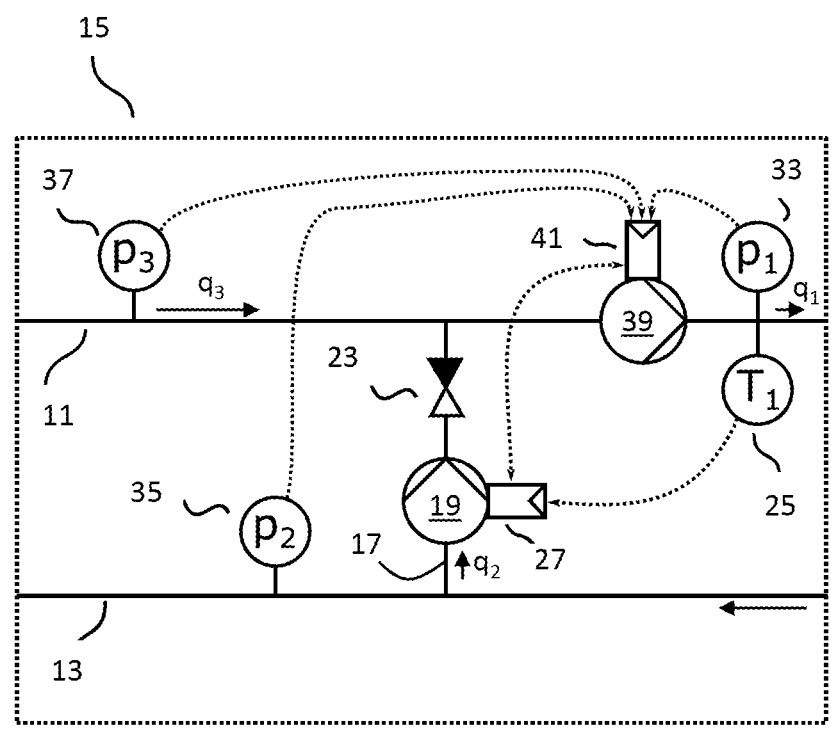
FIG. 7 is a schematic view showing a further embodiment of a system according to the present disclosure.

FIG. 7 shows another embodiment of the system 15 according to the present disclosure. In contrast to the previously described embodiments, the pressure difference $\Delta p$ is not determined by a single differential pressure sensor 23, but based on pressure measurements of two or more pressure sensors 33, 35, 37. A first pressure sensor 33 is installed at the feed line 11 downstream of the bypass line 17. A second pressure sensor 35 is installed at the return line 13. A third pressure sensor 37 is installed at the feed line 11 upstream of the bypass line 17. The pressure difference $\Delta p$ is then given by $\Delta p=p_3-p_2$, wherein $p_2$ is the pressure measured by the second pressure sensor 35 and $p_3$ is the pressure measured by the third pressure sensor 37. In the embodiment shown in FIG. 7, there is a second pump 39 installed at the feed line 11 between the bypass line 17 and the first temperature sensor 25. Such a second pump 39 may already be available or installed to boost the pressure in the feed line 11. The second pump 39 may be controlled by a separate second control unit 41 receiving the pressure measurements $p_1$, $p_2$ and $p_3$ from the pressure sensors 35, 37, 39. The second control unit 41 is in signal connection with the control unit 27 for controlling the speed of the bypass pump 19 and passes on the information about the pressure difference $\Delta p=p_3-p_2$ to the control unit 27 for the feed-forward control to regulate the bypass flow accordingly. The control units 27, 41 are preferably integrated into the bypass pump 19 and the second pump 39, respectively. Alternatively, one or more of the control units 27, 41 may be implemented in a controller separate from the pumps 19, 39.

Figure 8:
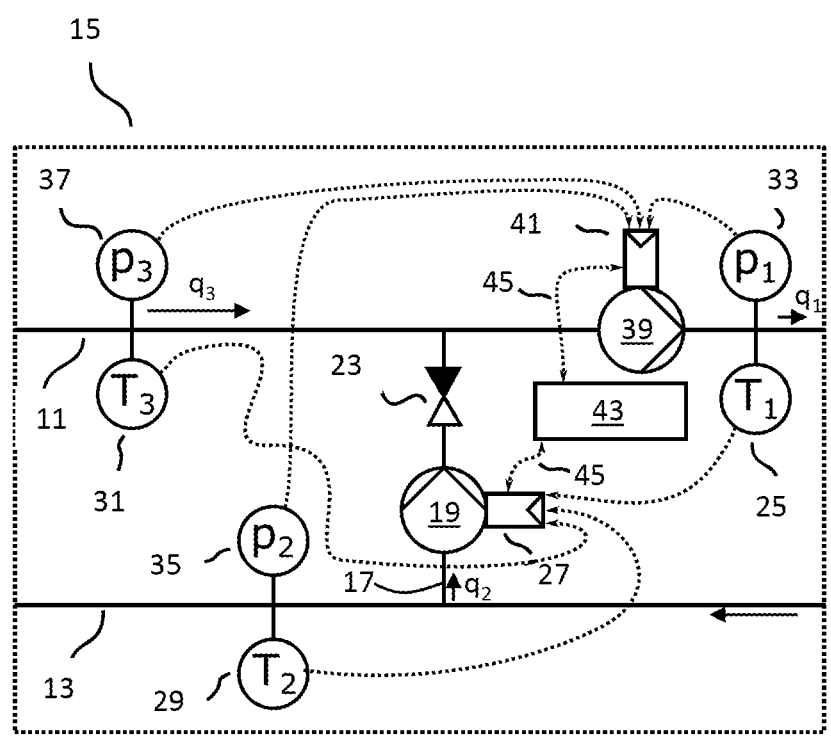
FIG. 8 is a schematic view showing a further embodiment of a system according to the present disclosure.

As shown in FIG. 8, a third control unit 43, preferably an external programmable logic controller (PLC), is provided in addition to the control units 27, 41 that are integrated in the bypass pump 19 and the second pump 39, respectively. The third external control unit 41 may be signal-connected to the other control units 27, 41 by bus connections 45. The temperature measurements $T_1$, $T_2$ and $T_3$ of the temperature sensors 25, 31, 33 are communicated to the first control unit 27 and the pressure measurements $p_1$, $p_2$ and $p_3$ of the pressure sensors 35, 37, 39 are communicated to the second control unit 41. The external third control unit 43 may be used to carry out the control method and to command the control units 27, 41 to run the pumps 19, 39 at a certain speed.

Figure 9A:
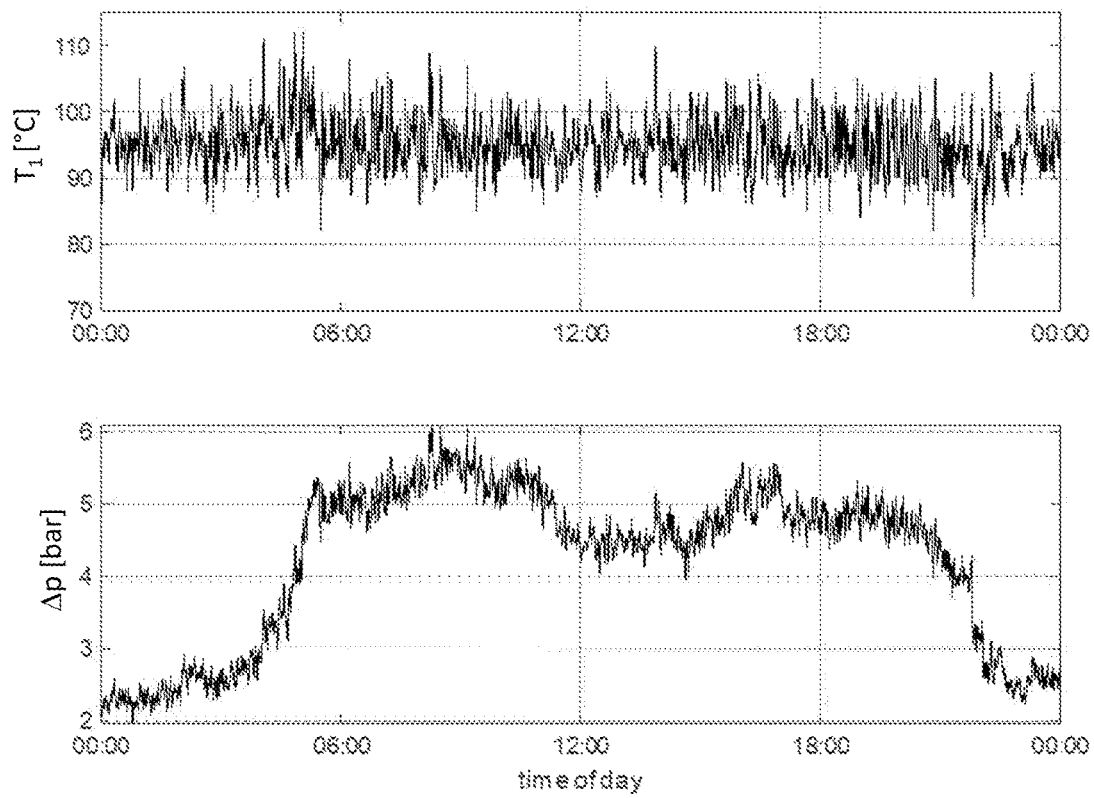
FIG. 9a is schematic view showing a feed line temperature $T_1$ downstream of the bypass line and a pressure difference $\Delta p$ over the time of the day without applying the control method according to the present disclosure.
Figure 9B:
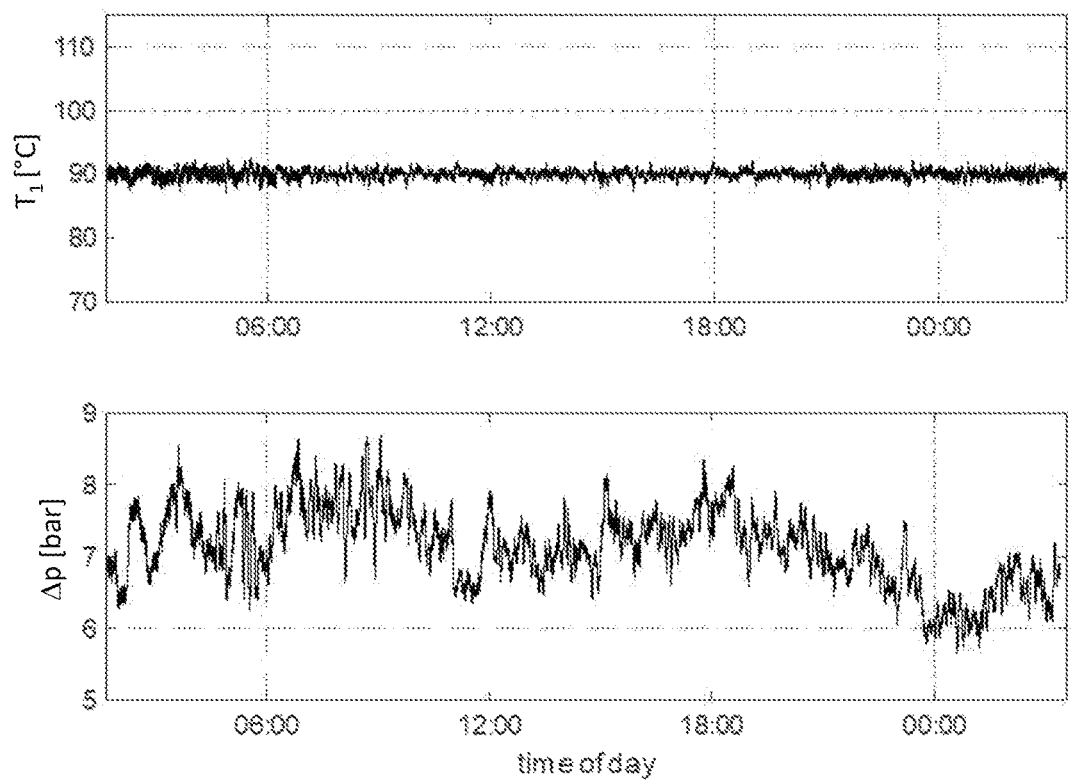
FIG. 9b schematic view showing a feed line temperature $T_1$ downstream of the bypass line and a pressure difference $\Delta p$ over the time of the day in with applying the control method according to the present disclosure.

FIG. 9a shows an example of how the uncontrolled pressure difference Δp behaves over the time of a day in the bottom plot. In the top plot, FIG. 9a shows the resulting fluctuations of the feed line temperature $T_1$ if the control method described herein is not applied. As can be seen, the feed line temperature $T_1$ fluctuates a lot due to the uncontrolled fluctuations of the pressure difference Δp between the feed line 11 and the return line 13. Such a situation is not tolerable for a utility provider operating the fluid distribution network 1. The goal is to achieve a stable desired feed line temperature $T_1$ despite of the uncontrolled pressure fluctuations Δp. The result of applying the control method described herein is shown in FIG. 9b. The pressure fluctuations are still uncontrolled and present over the time of the day, but the feed line temperature $T_1$ is very stable within a small band about a target feed line temperature $T_1^*=90°$. This shows that the system and method described herein provide an efficient solution to regulate a temperature of a thermal energy carrying fluid in a sector of a fluid distribution network.

While specific embodiments of the invention have been shown and described in detail to illustrate the application of the principles of the invention, it will be understood that the invention may be embodied otherwise without departing from such principles.

LIST OF REFERENCE NUMERALS 1 fluid distribution network
3 thermal energy source
5 feeder pump
7 thermal energy consumers
9 sector of fluid distribution network
11 feed line
12 heat exchanger
13 return line
15 system
17 bypass line
19 bypass pump
21 non-return valve
23 differential pressure sensor
25 first temperature sensor
27 first control unit
29 second temperature sensor
31 third temperature sensor
33 first pressure sensor
35 second pressure sensor
37 third pressure sensor
39 second pump
41 second control unit
43 third control unit
45 bus connection

What is claimed is:

1. A system for regulating a temperature of a thermal energy carrying fluid in a sector of a fluid distribution network, the fluid distribution network comprising a feed line for transporting the fluid from a thermal energy source to at least one thermal energy consumer located within the sector and a return line for transporting the fluid back from the at least one thermal energy consumer to the thermal energy source, the system comprising:

a bypass line connecting the return line to the feed line for mixing fluid from the return line into the feed line;
a bypass pump arranged at the bypass line for pumping fluid from the return line to the feed line;
a temperature sensor arranged and configured to determine a temperature of the fluid in the feed line downstream of the bypass line;
a pressure sensor arranged and configured to determine an uncontrolled pressure difference between the feed line and the return line, or to determine a pressure difference correlating therewith; and
a control unit configured to control a speed of the bypass pump based on a combination of:
a closed-loop control to provide a fluid flow in the bypass line for achieving a target feed line temperature based on the determined feed line temperature $T^*_1$, wherein the control unit is configured to set a target bypass fluid flow $q^*(T_1)$ to minimize a deviation $e_T = T^*_1 - T_1$ between the determined feed line temperature $T_1$ and a target feed line temperature $T^*_1$; and
a feed-forward control to compensate fluctuations of the pressure difference between the feed line and the return line based on the determined pressure difference.

2. The system according to claim 1, wherein the control unit is configured to combine the closed-loop control and the feed-forward control by determining a target speed (ω) as a parameterized pump model-based function $\omega = f^{-1}(q^*(T_1), p)$, wherein the pump model-based function $\omega = f^{-1}(q^*(T_1), p)$ is parameterized by at least two pre-determined parameters $a_{h1}, a_{h3}$.

3. The system according to claim 1, wherein the control unit is configured to set a pump differential pressure p to compensate for the determined pressure difference Δp.

4. The system according to claim 1, further comprising a non-return valve at the bypass line downstream of the at least one bypass pump, wherein the non-return valve is configured to prevent a fluid flow through the bypass line from the feed line to the return line.

5. The system according to claim 4, wherein the pressure sensor is arranged and configured to determine the pressure difference by measuring a difference between:
a pressure in the bypass line upstream of the bypass pump or in the return line; and
a pressure downstream of the non-return valve or a pressure upstream of the non-return valve and downstream of the bypass pump, or a pressure in the feed line upstream of the at least one bypass line.

6. The system according to claim 1, further comprising:
a temperature sensor arranged and configured to determine a temperature of the fluid in the return line; and
a temperature sensor arranged and configured to determine a temperature of the fluid in the feed line upstream of the bypass line, wherein the control unit is configured to set a target speed based on a feed-forward control to compensate uncontrolled fluctuations of a temperature difference between the temperature of the fluid in the feed line upstream of the bypass line and the temperature of the fluid in the return line.

7. The system according to claim 1, wherein the control unit is configured to stop the bypass pump if the speed is below a pre-determined stop speed threshold, and wherein the control unit is configured to start the bypass pump if the speed is at or above a pre-determined start speed threshold.

8. The system according to claim 1, wherein the control unit is configured, upon start-up of the bypass pump, to ramp up the feed-forward control to compensate uncontrolled fluctuations of the pressure difference based on a ramp-up value multiplied with the determined pressure difference.

9. A method for regulating a temperature of a thermal energy carrying fluid in a sector of a fluid distribution network, the fluid distribution network comprising: a feed line for transporting the fluid from a thermal energy source to at least one thermal energy consume located within the sector; a return line for transporting the fluid back from the at least one thermal energy consumer to the thermal energy source; and a bypass line connecting the return line to the feed line for mixing fluid from the return line into the feed line, wherein the method comprises the steps of:
- determining a temperature of the fluid in the feed line downstream of the bypass line by at least one temperature sensor;
- determining a pressure difference between the feed line and the return line by at least one pressure sensor, or a pressure difference correlating therewith;
- controlling a speed of at least one bypass pump that is arranged at a bypass line connecting the return line to the feed line for mixing fluid from the return line into the feed line, wherein said controlling of the speed of the bypass pump is based on a combination of:
  - a closed-loop control to provide a fluid flow in the bypass line for achieving a target feed line temperature based on the determined feed line temperature $T^*_1$, wherein a target bypass fluid flow $q^*(T_1)$ is set to minimize a deviation $e_T = T^*_1 - T_1$ between the determined feed line temperature $T_1$ and a target feed line temperature $T^*_1$; and
  - a feed-forward control to compensate uncontrolled fluctuations of the pressure difference between the feed line and the return line based on the determined pressure difference.

10. The method according to claim 9, wherein combination of the closed-loop control and the feed-forward control comprises determining a target speed ($\omega$) as a parameterized pump model-based function $\omega = f^{-1}(q^*(T_1), p)$, and wherein a pump differential pressure p is set to compensate for the determined pressure difference, wherein the pump model-based function $\omega = f^{-1}(q^*(T_1), p)$ is parameterized by at least two pre-determined parameters.

11. The method according to claim 9, further comprising preventing a fluid flow through the bypass line from the feed line to the return line by a non-return valve arranged at the bypass line downstream of the bypass pump.

12. The method according to claim 11, wherein determining the pressure difference comprises measuring a difference between:
- a pressure in the bypass line upstream of the bypass pump or in the return line, and
- a pressure downstream of the non-return valve or a pressure upstream of the non-return valve and downstream of the bypass pump, or a pressure in the feed line upstream of the at least one bypass line.

13. The method according to claim 9, further comprising:
determining a temperature of the fluid in the return line by at least one temperature sensor; and
determining a temperature of the fluid in the feed line upstream of the bypass line by at least one temperature sensor, wherein controlling of the speed of the bypass pump comprises setting a target speed based on a feed-forward control to compensate uncontrolled fluctuations of a temperature difference between the temperature of the fluid in the feed line upstream of the bypass line and the temperature of the fluid in the return line.

14. The method according to claim 9, further comprising:
stopping the bypass pump if the speed is below a pre-determined stop speed threshold; and
starting the bypass pump if the speed is at or above a pre-determined start speed threshold.

15. The method according to claim 9, further comprising ramping up, upon start-up of the bypass pump, the feed-forward control to compensate uncontrolled fluctuations of the pressure difference based on a ramp-up value multiplied with the determined pressure difference.

16. The method according to claim 10, further comprising preventing a fluid flow through the bypass line from the feed line to the return line by a non-return valve arranged at the bypass line downstream of the bypass pump.

17. The method according to claim 10, further comprising:
determining a temperature of the fluid in the return line by at least one temperature sensor; and
determining a temperature of the fluid in the feed line upstream of the bypass line by at least one temperature sensor, wherein controlling of the speed of the bypass pump comprises setting a target speed based on a feed-forward control to compensate uncontrolled fluctuations of a temperature difference between the temperature of the fluid in the feed line upstream of the bypass line and the temperature of the fluid in the return line.

18. The method according to claim 11, further comprising:
determining a temperature of the fluid in the return line by at least one temperature sensor; and
determining a temperature of the fluid in the feed line upstream of the bypass line by at least one temperature sensor, wherein controlling of the speed of the bypass pump comprises setting a target speed based on a feed-forward control to compensate uncontrolled fluctuations of a temperature difference between the temperature of the fluid in the feed line upstream of the bypass line and the temperature of the fluid in the return line.

19. The method according to claim 12, further comprising:
determining a temperature of the fluid in the return line by at least one temperature sensor; and
determining a temperature of the fluid in the feed line upstream of the bypass line by at least one temperature sensor, wherein controlling of the speed of the bypass pump comprises setting a target speed based on a feed-forward control to compensate uncontrolled fluctuations of a temperature difference between the temperature of the fluid in the feed line upstream of the bypass line and the temperature of the fluid in the return line.

* * * * *